(12) United States Patent
Belanger

(10) Patent No.: US 9,109,551 B2
(45) Date of Patent: Aug. 18, 2015

(54) LIQUID TRAP FOR FUEL VAPOR VALVE

(75) Inventor: Peter Gerard Belanger, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/114,157

(22) Filed: May 24, 2011

(65) Prior Publication Data

US 2012/0298211 A1   Nov. 29, 2012

(51) Int. Cl.
*F16K 23/00* (2006.01)
*F02M 25/08* (2006.01)
*B60K 15/035* (2006.01)

(52) U.S. Cl.
CPC ...... *F02M 25/0872* (2013.01); *B60K 15/03519* (2013.01); *B60K 2015/03509* (2013.01); *F02M 2025/0863* (2013.01); *Y10T 137/3084* (2015.04)

(58) Field of Classification Search
CPC .............. B60K 15/03519; B60K 2015/03509
USPC .......... 137/175, 197, 202, 312, 314; 251/118, 251/127; 138/44, 40
See application file for complete search history.

(56) References Cited

U.S. PATENT DOCUMENTS

| | | | |
|---|---|---|---|
| 2,185,098 A * | 12/1939 | Woodbridge | 429/85 |
| 5,392,804 A | 2/1995 | Kondo et al. | |
| 5,413,137 A | 5/1995 | Gimby | |
| 5,577,526 A * | 11/1996 | Kasugai et al. | 137/202 |
| 5,711,339 A | 1/1998 | Kurihara | |
| 6,035,884 A | 3/2000 | King et al. | |
| 6,058,970 A | 5/2000 | Osaki et al. | |
| 6,062,250 A | 5/2000 | Takahashi | |
| 6,145,532 A | 11/2000 | Tuckey | |
| 6,311,675 B2 | 11/2001 | Crary et al. | |
| 6,349,860 B1 * | 2/2002 | McMahon et al. | 222/556 |
| 6,425,379 B2 * | 7/2002 | Shimamura et al. | 123/516 |
| 6,586,131 B2 * | 7/2003 | Hallifax et al. | 429/53 |
| 6,983,772 B1 * | 1/2006 | Lawrence et al. | 141/311 A |
| 7,159,607 B2 * | 1/2007 | Frohwein et al. | 137/202 |
| 2001/0054438 A1 * | 12/2001 | Shimamura et al. | 137/202 |
| 2004/0011401 A1 * | 1/2004 | Kato | 137/202 |
| 2005/0211298 A1 * | 9/2005 | Frohwein | 137/202 |
| 2006/0163288 A1 * | 7/2006 | Su | 222/321.2 |
| 2006/0225785 A1 * | 10/2006 | Oosaki | 137/202 |
| 2008/0257771 A1 * | 10/2008 | Vos et al. | 206/457 |
| 2009/0194170 A1 * | 8/2009 | Martin et al. | 137/197 |
| 2009/0293962 A1 * | 12/2009 | Ando et al. | 137/409 |

(Continued)

FOREIGN PATENT DOCUMENTS

DE  102008005753 A1  7/2009
WO  2010146452 A1  12/2010

OTHER PUBLICATIONS

European Patent Office; International Search Report and Written Opinion issued in corresponding International Patent Application PCT/US2012/039419. Date of Mailing: Nov. 16, 2012.

*Primary Examiner* — Craig Schneider
*Assistant Examiner* — Minh Le
(74) *Attorney, Agent, or Firm* — Dykema Gossett PLLC

(57) ABSTRACT

An insert for a fuel vapor valve traps liquid fuel and prevent the fuel from leaking out of the valve. The insert includes a tube and a skirt disposed around the tube. The skirt seals against a portion of the fuel vapor valve, such as against an inner wall of a valve port or on a top portion of the valve to act as a valve cap. The tube and the skirt cooperate with the fuel vapor valve to form a reservoir that traps fuel.

20 Claims, 3 Drawing Sheets

(56) References Cited

U.S. PATENT DOCUMENTS

| | | | |
|---|---|---|---|
| 2010/0051114 A1* | 3/2010 | Yamada et al. | 137/202 |
| 2010/0319787 A1* | 12/2010 | Hirata | 137/165 |
| 2011/0005614 A1* | 1/2011 | Pifer et al. | 137/409 |

* cited by examiner

LIQUID TRAP FOR FUEL VAPOR VALVE

TECHNICAL FIELD

The present invention relates to liquid traps, and more particularly to a liquid trap and baffle that can be inserted into a fuel vapor valve.

BACKGROUND OF THE INVENTION

Fuel vapor valves, such as fuel limit vent valves (FLVVs), grade vent valves (GVVs), and rollover valves (ROVs) are used in vehicle fuel emissions systems to control vapor pressure, induce filler nozzle shutoff, and prevent fuel spillage from the system. Although these valves are designed to minimize leakage of liquid fuel out of the valve, some customers have increased the stringency of their requirements and have requested valves with virtually zero leakage.

While it is possible to redesign the valves to meet these requirements, there is a desire for a simpler solution that can reduce leaks in fuel vapor valves without requiring extensive modifications to existing valves. There is also a desire for a leak-reduction device that can also be incorporated into existing fuel vapor valves to reduce development time and cost.

SUMMARY OF THE INVENTION

An insert for a fuel vapor valve traps liquid fuel and prevent the fuel from leaking out of the valve. The insert includes a tube and a skirt disposed around the tube. The skirt seals against a portion of the fuel vapor valve, such as against an inner wall of a valve port or on a top portion of the valve to act as a valve cap. The tube and the skirt cooperate with the fuel vapor valve to form a reservoir that traps liquid fuel.

DETAILED DESCRIPTION OF THE INVENTION

Figure 1:
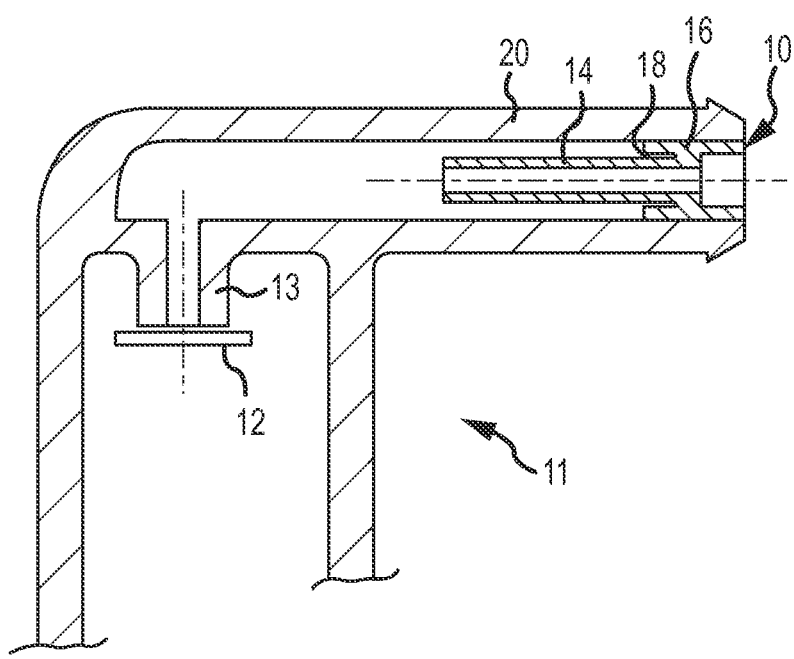
FIG. 1 is a cross-sectional view of a liquid trap apparatus installed into a fuel vapor valve.
Figure 2:
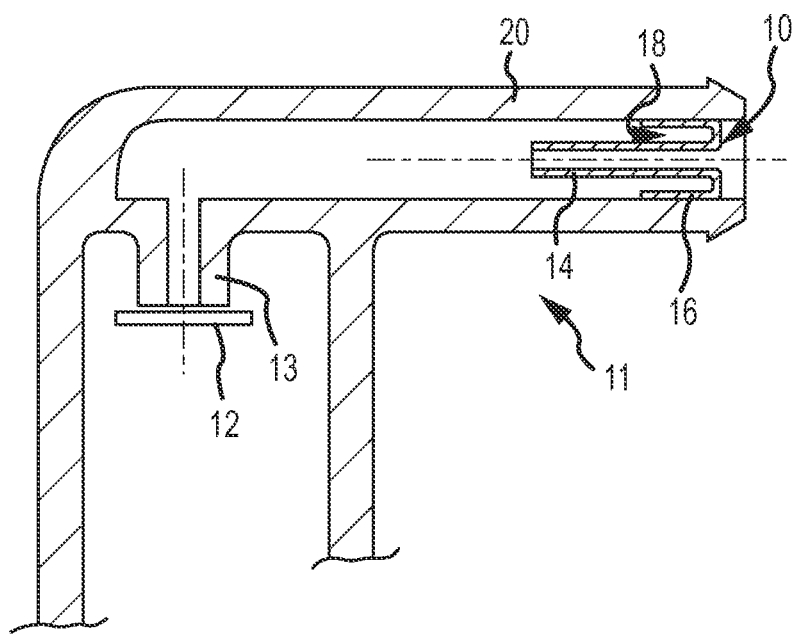
FIG. 2 is a cross-sectional view of a variation of the apparatus in FIG. 1 installed into a fuel vapor valve.

Referring to FIGS. 1 and 2, an insert 10 for a fuel vapor valve 11 (which is only partially shown in the Figures) acts as trap for liquid fuel that may leak past a valve seal 12 and a valve seat 13. The position of the valve seal 12 may be controlled by, for example, a float or any other known method or structure. Although the valve seal 12 and valve seat 13 may be designed to prevent leakage, fuel may still potentially leak past the valve seat 13 into other portions of the valve 11 if the valve 11 is in certain orientations or inverted. The insert 10 is designed to act as a backup leak prevention structure to make the overall valve 11 virtually leakproof.

The insert 10 in the present embodiment includes a tube 14 and a skirt 16 surrounding the tube 14. The skirt 16 may be tube-shaped (FIGS. 1 and 2) or planar. The skirt 16 also may be concentric with the tube 14. The tube 14 and skirt 16 form a reservoir 18 between the tube 14 and an inner wall of a port 20 in the valve 11. The reservoir 18 traps liquid fuel that has escaped past the valve seat 13 from further leaking through the port 20 and out of the valve 11.

The insert 10 may be made from any material, such as plastic or metal, that is appropriate for the valve in which the insert 10 will be used.

The skirt 16 may be sized so that it fits snugly within the port 20. The insert 10 can be secured inside the port 20 via any means that provides a seal between the skirt 16 and the inner wall of the port 20, including but not limited to press-fitting, welding, bonding, and/or adhesives. The seal between the skirt 16 of the insert 10 and the port 20 prevents liquid fuel that leaked past the valve seat 13 from leaking out of the valve 11 through the port 20.

The dimensions of the tube 14 and the skirt 16 may be selected to trap a predetermined amount of liquid between the insert 10 and the port 20. For example, as shown in FIGS. 1 and 2, the difference between the diameters of the tube 14 and the skirt 16, as well as the length of the tube 14 itself, will change the volume of liquid trapped by the insert 10. FIG. 1, for example, shows an embodiment with a small difference between the tube 14 and skirt 16 diameters and a relatively long tube 14, while FIG. 2 shows an embodiment with a large difference between the tube 14 and skirt 16 diameters and a shorter tube 14. Varying the relative diameters of the tube 14 and skirt 16 as well as the tube 14 length will vary the liquid volume trapped by the insert 10.

Figure 3:
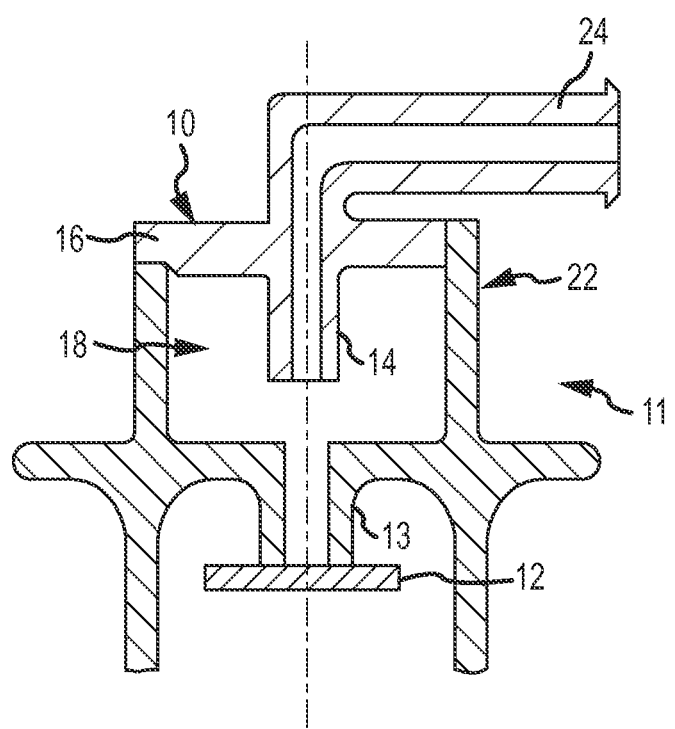
FIG. 3 is a cross-sectional view of a liquid trap apparatus according to another embodiment of the invention and installed into a fuel vapor valve.

FIG. 3 illustrates the insert 10 according to another embodiment of the invention. The insert 10 in this embodiment attached to a top portion 22 of the valve 11 instead of in the port 20. More particularly, the insert 10 may act as a liquid discriminating cap that replaces an existing cap for the valve 11. The skirt 16 in this embodiment may be shaped as a flange instead of a tube as in the embodiment of FIGS. 1 and 2 so that it can fit be welded or otherwise attached to the top of the valve 11. The insert 10 in this embodiment also includes an insert port 24 that is integrally formed as part of the insert 10, thereby combining the functions of the insert 10 with the functions of a valve cap.

In this embodiment, the tube 14 and the skirt 16 of the insert 10 cooperate with the top portion 22 of the valve 11 to create the reservoir 18 that traps liquid fuel leaking past the valve seat 13. As in the embodiments of FIGS. 1 and 2, the length and diameter of the tube 14 in this embodiment can be adjusted to change the volume of the reservoir 18. Since the insert 10 of FIG. 3 incorporates the port 24 into the insert 10 itself, this embodiment may be used in valve designs having ports that are too small to accommodate the insert 10 shown in FIGS. 1 and 2.

The insert 10 according to any of the embodiments may also have functions other than preventing leaks. For example, the insert 10 may also act as a baffle to restrict sloshing of liquid fuel within the port 20. More particularly, the tube 14 breaks up fluid flow in the port 20 to prevent sloshing. Also, the diameter of the tube 14 may be selected to act as a metering orifice that restricts flow in a larger orifice. This would allow the same valve 11 design to be used for both high flow applications (without the insert 10) and low flow applications (with the insert 10).

As a result, the insert 10 traps liquid fuel that may have leaked past the valve seat 13 in the vapor valve 11, thereby making the valve 11 itself virtually leak-proof. The simple structure of the insert 10 allows it to be retrofitted into existing valves 12. Since the insert 10 does not require any changes in the valve 11 structure itself, and because the insert 10 has a simple deign, it is easy to create different inserts 10 that can be retrofitted to different existing fuel vapor valves 11 and provide the desired leak-prevention characteristics with minimal development time and cost.

While the best modes for carrying out the invention have been described in detail, those familiar with the art to which this invention relates will recognize various alternative designs and embodiments for practicing the invention within the scope of the appended claims.

What is claimed is:

1. A fuel vapor valve, comprising:
    a housing having a port with an open end;
    a valve seat formed in the housing and defining a first centerline;
    a valve seal that can seal against the valve seat; and
    an insert that is configured to be inserted into the open end of the port to trap liquid fuel that leaks past the valve seal, the insert having a tube that defines a second centerline, and
    a skirt disposed around the tube, wherein the skirt seals against a portion of the fuel vapor valve,
    and wherein the tube and the skirt cooperate with the portion of the fuel vapor valve to form a reservoir that traps liquid fuel, and the insert is oriented at an angle relative to the valve seat such that the second centerline defined by the tube of the insert is configured to intersect the first centerline defined by the valve seat.

2. The fuel vapor valve of claim 1, wherein the skirt seals against an inner wall of the port.

3. The fuel vapor valve of claim 1, wherein a diameter of the tube, a length of the tube, and a diameter of the skirt are selected to create a reservoir with a predetermined volume.

4. The fuel vapor valve of claim 1, wherein the skirt includes a planar portion that radially extends outwardly from the tube and a tube-shaped portion that axially extends from an outer edge of the skirt.

5. The fuel vapor valve of claim 4, wherein the tube-shaped portion of the skirt axially extends in both directions from the outer edge of the skirt.

6. The fuel vapor valve of claim 4, wherein a length of the tube is longer than a length of the tube-shaped portion of the skirt.

7. The fuel vapor valve of claim 1, wherein 1, the second centerline defined by the tube of the insert is orthogonal to the first centerline defined by the valve seat.

8. The fuel vapor valve of claim 1, wherein the second centerline defined by the tube of the insert is concentric with a third centerline defined by the open end of the port.

9. The fuel vapor valve of claim 1, wherein the skirt is sized to fit within the open end of the port and the skirt seals against an inner wall of the port adjacent to the open end.

10. The fuel vapor valve of claim 1, wherein the skirt of the insert is concentric with the tube of the insert.

11. A fuel vapor valve comprising:
    a housing having a valve portion and a port with an open end, wherein the valve portion includes a valve seat that defines a first centerline; and
    an insert that is configured to be inserted into the open end of the port, the insert including a tube that defines a second centerline, and a skirt that circumferentially extends around the tube, wherein the tube and the skirt cooperate with an inner wall of the port to form a reservoir that is configured to trap a liquid, and the insert is oriented at an angle relative to the valve seat such that the second centerline defined by the tube of the insert is configured to intersect the first centerline defined by the valve seat.

12. The fuel vapor valve of claim 11, wherein the skirt includes a planar portion that radially extends outwardly from the tube and a tube-shaped portion that axially extends from an outer edge of the skirt.

13. The fuel vapor valve of claim 12, wherein the tube-shaped portion of the skirt axially extends in both directions from the outer edge of the skirt.

14. The fuel vapor valve of claim 12, wherein the tube-shaped portion of the skirt seals against an inner wall of the port.

15. The fuel vapor valve of claim 11, wherein the skirt is sized to fit within the open end of the port and the skirt seals against an inner wall of the port adjacent to the open end.

16. The fuel vapor valve of claim 11, wherein the skirt of the insert is concentric with the tube of the insert.

17. The fuel vapor valve of claim 11, wherein a diameter of the tube, a length of the tube, and a diameter of the skirt are selected to create a reservoir with a predetermined volume.

18. The fuel vapor valve of claim 11, wherein the second centerline defined by the tube of the insert is orthogonal to the first centerline defined by the valve seat.

19. The fuel vapor valve of claim 11, wherein the second centerline defined by the tube of the insert is concentric with a third centerline defined by the open end of the port.

20. The fuel vapor valve of claim 12, wherein a length of the tube is longer than a length of the tube-shaped portion of the skirt.

* * * * *

UNITED STATES PATENT AND TRADEMARK OFFICE
CERTIFICATE OF CORRECTION

PATENT NO. : 9,109,551 B2  
APPLICATION NO. : 13/114157  
DATED : August 18, 2015  
INVENTOR(S) : Peter Gerard Belanger Page 1 of 1

It is certified that error appears in the above-identified patent and that said Letters Patent is hereby corrected as shown below:

In the Claims:
        COLUMN 3, line 39 (Claim 7, line 1), delete the second instance of "1,".

Signed and Sealed this
Eighth Day of March, 2016

Michelle K. Lee
*Director of the United States Patent and Trademark Office*